(12) United States Patent
Johnson et al.

(10) Patent No.: US 9,955,703 B2
(45) Date of Patent: May 1, 2018

(54) METHOD AND SYSTEM FOR PROCESSING MEAT PRODUCTS IN A MODIFIED ATMOSPHERE

(71) Applicant: JBS USA, LLC, Greeley, CO (US)

(72) Inventors: John Erick Johnson, Fullerton, CA (US); Jose Luis Montes, Norwalk, CA (US); Brian Charles Adams, Anaheim, CA (US)

(73) Assignee: JBS USA, LLC, Greeley, CO (US)

( * ) Notice: Subject to any disclaimer, the term of this patent is extended or adjusted under 35 U.S.C. 154(b) by 802 days.

(21) Appl. No.: 14/089,013

(22) Filed: Nov. 25, 2013

(65) Prior Publication Data

US 2015/0147449 A1    May 28, 2015

(51) Int. Cl.
| | |
|---|---|
| *B65B 7/00* | (2006.01) |
| *A23B 4/16* | (2006.01) |
| *A23L 3/3445* | (2006.01) |
| *B65B 25/06* | (2006.01) |
| *B65B 31/02* | (2006.01) |

(52) U.S. Cl.
CPC ............ *A23B 4/16* (2013.01); *A23L 3/3445* (2013.01); *B65B 25/067* (2013.01); *B65B 31/028* (2013.01)

(58) Field of Classification Search
CPC ......... B65B 31/02; B65B 7/00; B65B 31/028; A23B 4/27; A23B 4/16
USPC ... 53/432, 51, 287, 559, 453, 282, 309, 152, 53/485; 426/61, 129, 232, 316, 392, 395
See application file for complete search history.

(56) References Cited

U.S. PATENT DOCUMENTS

| | | | |
|---|---|---|---|
| 3,681,092 A | 8/1972 | Titchenal et al. | |
| 3,922,358 A | 11/1975 | Follett | |
| 5,374,433 A | 12/1994 | Bowling et al. | |
| 5,443,852 A | 8/1995 | Shahidi et al. | |
| 5,501,066 A | 3/1996 | Errasti Iriarte et al. | |
| 5,711,978 A | 1/1998 | Breen | |
| 5,869,113 A | 2/1999 | Clayton et al. | |
| 5,989,610 A | 11/1999 | Ruzek | |
| 6,039,984 A | 3/2000 | Bowling et al. | |
| 6,054,161 A | 4/2000 | Palmer | |
| 6,061,998 A | 5/2000 | Gorlich | |
| 6,113,962 A | 9/2000 | Spencer | |

(Continued)

FOREIGN PATENT DOCUMENTS

| | | |
|---|---|---|
| EP | 1304040 | 4/2003 |
| GB | 2031710 | 4/1980 |

(Continued)

OTHER PUBLICATIONS

Elamin, "FDA asked to rescind use of carbon monoxide for meats", Food Production Daily—USA, Nov. 17, 2005, 3 pages.

(Continued)

*Primary Examiner* — Nathaniel Chukwurah
*Assistant Examiner* — Mary Hibbert
(74) *Attorney, Agent, or Firm* — Sheridan Ross P.C.

(57) ABSTRACT

A method and system for wrapping meat in containers is provided. The method and system provide a modified atmosphere, other than that which exists as standard air, to a container such that a final sealed product contains an internal volume or atmosphere of modified gas. In-line processing features dispense the desired modified gas such that minimal interruption is provided in an automated or partially automated packing operation.

12 Claims, 5 Drawing Sheets

(56) References Cited

U.S. PATENT DOCUMENTS

| | | | |
|---|---|---|---|
| 6,210,730 B1 | 4/2001 | Mitchell | |
| 6,221,411 B1 | 4/2001 | Sanfillippo | |
| 6,287,610 B1 | 9/2001 | Bowling et al. | |
| 6,305,149 B1 * | 10/2001 | Gorlich | B26D 7/10 53/329.5 |
| 6,383,538 B1 | 5/2002 | Allen et al. | |
| 6,569,474 B2 | 5/2003 | Clayton et al. | |
| 6,716,464 B1 | 4/2004 | Schlegel et al. | |
| 7,022,005 B2 | 4/2006 | Potter et al. | |
| 7,147,799 B2 | 5/2006 | DelDuca | |
| 7,290,380 B2 | 11/2007 | Natterer | |
| 7,935,373 B2 | 5/2011 | Brackenridge et al. | |
| 7,946,099 B2 | 5/2011 | Sparakowski et al. | |
| 8,158,176 B2 | 4/2012 | Sterner | |
| 2001/0017021 A1 * | 8/2001 | Sanfilippo | B65B 31/028 53/432 |
| 2002/0162971 A1 * | 11/2002 | Koenck | A23B 4/015 250/455.11 |
| 2003/0054072 A1 | 3/2003 | Merriman et al. | |
| 2003/0054075 A1 | 3/2003 | Sybeldon | |
| 2003/0170352 A1 | 9/2003 | Owen et al. | |
| 2003/0185948 A1 | 10/2003 | Garwood | |
| 2004/0115322 A1 | 6/2004 | Osborn | |
| 2004/0144063 A1 | 7/2004 | Countz | |
| 2004/0265446 A1 | 12/2004 | McNaughton | |
| 2008/0038407 A1 | 2/2008 | Musat | |

FOREIGN PATENT DOCUMENTS

| | | |
|---|---|---|
| GB | 2187702 | 9/1987 |
| GB | 2246107 | 1/1992 |
| GB | 2296905 | 7/1996 |
| JP | 54-160774 | 12/1979 |
| JP | 04-075553 | 3/1992 |
| JP | 04-267771 | 9/1992 |
| JP | 05-016973 | 1/1993 |
| JP | 05-336878 | 12/1993 |
| JP | 06-048449 | 2/1994 |
| JP | 2000-102342 | 4/2000 |
| JP | 2002-153207 | 5/2002 |
| WO | WO 91/03407 | 3/1991 |
| WO | WO 02/44026 | 6/2002 |

OTHER PUBLICATIONS

Tarantino, "Agency Response Letter GRAS Notice No. GRN 000167", CFSAN/Office of Food Additive Safety, Sep. 29, 2005, 3 pages.

* cited by examiner

METHOD AND SYSTEM FOR PROCESSING MEAT PRODUCTS IN A MODIFIED ATMOSPHERE

TECHNICAL FIELD

The present invention relates to methods, systems and devices for producing a package and to a packaging machine. More specifically, the present invention relates to methods, systems, and devices for packing meat and similar products for transport and/or sale.

BACKGROUND OF INVENTION

Packaging machines, so-called tray closing machines are known in which products are packaged into pre-fabricated tray-shaped containers and closed with a film, for example from U.S. Pat. No. 7,290,380, which is hereby incorporated by reference in its entirety. Furthermore, packaging machines that are able to form trays themselves from sheet material are known. U.S. Pat. No. 5,501,066 to Iriarte et al. discloses a stretchable film tray wrapping machine, including means for stretching and cutting packaging material and is hereby incorporated by reference in its entirety.

Modified atmosphere packaging ("MAP") is known as the removal and/or the replacement of the atmosphere surrounding a product before sealing the product within vapor-barrier materials. In general, a package protects products like meat against deteriorative effects including discoloration, off-flavor, off-odor development, nutrient loss, texture changes, pathogenicity, and other measurable factors.

In order to obtain the red meat color, commercially available packages typically contain a permeable film, usually leading to a very short shelf life. To prolong shelf life, a so-called 'motherbag' is often used, providing a secondary packaging with a low oxygen atmosphere during distribution. At points of sale, the single packs are typically unpacked and the meat is allowed to "bloom." Complications often associated with these methods and systems include an inability of the meat to bloom and/or lack of color uniformity.

SUMMARY OF INVENTION

One object of the present invention is to provide a method and system for efficiently and predictably wrapping or sealing meat products within a modified atmosphere.

A problem in the meat packing industry is undesirable exposure of meat to oxygen, and other reactive gases, in the ambient atmosphere. Such ambient oxygen causes oxidation of protein and fat molecules in the meat, reducing the shelf-life of the meat and resulting in a large of amount of waste. Thus it is desirable to limit the exposure of meat to oxygen. However, oxygen also has desirable effects on meat, in particular on the appearance of cut or ground meat. This is due to the meat containing myoglobin, which is a protein that accepts oxygen bound to hemoglobin in red blood cells. Myoglobin is largely responsible for determining meat color, both in the raw and cooked states. When meat is first cut, it has a deep, purplish red color due to the presence of deoxymyoglobin ("DMb"), which is myoglobin without bound oxygen. As the meat is exposed to the air, oxygen binds to the heme iron of the myoglobin, resulting in the formation of oxymyoglobin, which gives the meat a bright, cherry-red color. If oxygen is removed from the oxidized meat environment, the oxygen bound to the oxymyoglobin is removed (the oxymyoglobin is reduced), resulting in formation of deoxymyoglobin and discoloration of the meat. Thus, it can be seen that control of the environment surrounding the meat is necessary not only for control of spoilage, but for the appearance of the meat as well. Methods and systems of the present invention, and related apparatus, provide such control.

One broad aspect of the present invention provides for limited exposure of the meat to oxygen, thereby reducing oxidation and spoilage of the meat. Certain embodiments of method of the present invention generally include obtaining a piece of meat to be packaged, placing the meat into a modified atmosphere, and packaging the meat while it is in the modified atmosphere.

While the disclosure herein is primarily concerned with the packaging of meat, it should be appreciated that such discussion is merely exemplary and that the general methods and apparatus disclosed herein may be applicable to the packaging of any article that is reactive with a component in the ambient environment, including but not limited to food items such as pork, chicken, sea food, fruits, vegetables, processed foods, confections, bread, dairy products, and beer. Thus, for ease of discussion, the disclosed methods and apparatus will refer to packaging of an article, with meat being one representative example of an article.

One aspect of the present invention is a method for packaging an article, comprising completely surrounding the article with one or more packaging materials and sealing at least one of the one or more packaging materials so that the article is completely enclosed by the sealed packaging material, wherein at least the step of surrounding the article is conducted in a modified atmosphere, preferably where such atmosphere dimensions in space are confined to within about one foot from the article being packaged.

As used herein, a modified atmosphere refers to an atmospheric environment that differs from the ambient atmospheric environment in one or more characteristics such as, for example, composition, temperature or pressure, more preferably including various combinations of these conditions. In various embodiments, an atmospheric environment refers to the envelope of gases within a space defined in relation to a physical object. For example, and with particular regard to the present invention, an atmospheric environment may refer to the envelope of gases immediately surrounding the article to be packaged. As a further example, an atmospheric environment may refer to the gases present within a defined space such as, for example, an article wrapping station, preferably where the article is wrapped with a temperature limitation, such as within ten minutes from being produced, manufactured, or prepped for packaging. The dimension of such a space may be defined by, for example, physical structures, such as walls, curtains, air jets or curtains or water jets or curtains. According to certain embodiments of the present invention, the ambient atmospheric environment refers to mixture of gases found outside of the wrapping zone and in the general environment in which preparation for packaging of the article occurs. Thus, for example, with regard to the packaging of meat, the ambient environment is the mixture of gases present within the packaging plant (excluding the wrapping station), attached offices, on a loading dock, etc.

The composition of an atmospheric environment refers to the specific gases, and the amount of each gas, present in the specific atmospheric environment. Examples of such gases include, but are not limited to, oxygen, carbon dioxide, ozone, hydrogen, nitrogen, argon, krypton, neon, helium, xenon, hydrogen peroxide, chlorine dioxide, fluorine, bromine, iodine and/or any other suitable substances. In a modified atmospheric environment, the level of one or more of such gases differs significantly from the levels of such gases observed normally in the ambient environment. For example, the level of oxygen in a modified environment may be increased or decreased relative to the level found in the ambient environment, in order to alter the appearance or shelf-life of meat. Likewise, levels of other gases such as, for example, carbon dioxide may be altered in order to achieve a desired effect. Additionally, the modified atmospheric environment may contain gases not present at all, or in significantly greater concentrations than may be found in the ambient environment.

The modified environment may also differ from the ambient environment in characteristics other than the composition of gases. For example, the humidity of the modified atmospheric environment may be higher or lower than that of the ambient environment. Likewise, the modified atmospheric environment may differ from the ambient environment in temperature and/or pressure. Those skilled in the art will be able to determine the specific characteristics of the modified atmospheric environment ("MAE") necessary for packaging of a particular article.

As used herein, a packaging material is any material that can surround an article and that is able to control the flow of gases and/or liquid, from one side to another. In one embodiment, at least one packaging material used to package the article is completely impermeable to one or more gases. In one embodiment, the packaging material is selectively permeable to one or more gases. A packaging material that is selectively permeable may allow one gas (e.g., $CO_2$) to pass through the material while preventing a different gas (e.g., $O_2$) from passing through the packaging material. A packing material may also be differentially permeable. That is, the packaging material may allow different gases to pass though the packaging material at different rates. In one embodiment, the packaging material is completely impermeable to one or more gases in the modified environment. In one embodiment, the packaging material is completely impermeable to one or more gases in the ambient environment. In one embodiment, the packaging material is semi-permeable to water. In one embodiment, the packaging material is completely impermeable to water. Examples of suitable packaging materials include, but are not limited to, polypropylene, polystyrene, polyethylene, polyvinylchloride, and similar food-grade polymers.

As previously disclosed, the present method comprises surrounding the article to be packaged with one or more packaging materials. It should be appreciated that the phrase surrounding the article with packaging material indicates the article is mostly enclosed in packaging material at this step. That is, prior to sealing the packaging material gaps or openings in the packaging material may be present through which components from the modified environment may be able to come in contact with the article being packaged without first having to pass through the packaging material itself. It should also be appreciated that with regard to entry of the article into the modified atmospheric environment and surrounding of the article with packaging material, the order of such steps is not critical. Thus, for example, in one embodiment the article is first entered into modified atmospheric environment and then surrounded by packaging material. In a separate embodiment, the article is surrounded by packaging material and then entered into the modified atmospheric environment. Thus, in many embodiments, the order of the steps is not critical, so long as once the article has entered the modified atmospheric environment and is completely surrounded by such environment. Other embodiments, however, are specific to the ordering of steps as described herein.

Once the article has been surrounded by the packaging material, the packaging material is sealed to form an inside and an outside, so that the article is completely enclosed by the packaging material. The interior space comprises everything within the article side of the sealed package. The exterior space refers to everything on outside of the sealed package. Sealing of the packaging material may be accomplished using any methods known to those skilled in the art. Exemplary methods of sealing the packaging material include, but are not limited to, use of one or more adhesives, RF welding, ultrasonic welding, heat sealing, or any other suitable means known to those skilled in the art.

It is an aspect of certain embodiments of the invention that the step of sealing the packaging material be completed while the packaging-material-surrounded article is substantially within the modified atmospheric environment. In a preferred embodiment, the packaging-material-surrounded article is completely within the modified atmospheric environment. In this way, sealing of the packaging material ensures that the article remains in a modified atmospheric environment. Once the step of sealing the packaging material has been completed, the sealed package may then be removed from the modified atmospheric environment.

It will be appreciated by those skilled in the art of meat preparation and packaging that the packaging of meat is usually only one part of a much more integrated process. For example, packaging of meat may be one step in a process comprising cutting, trimming and washing of meat. Frequently, such processes are conducted using an apparatus comprising separate stations for each function. Thus, one embodiment of the present invention is a method for packaging an article, the method comprising:

a) providing a packaging station comprising a packaging zone, the packaging zone comprising a modified atmosphere;

b) introducing the article to the packaging zone so that the article is substantially surrounded by the modified atmosphere;

c) surrounding the article with one or more packaging materials so that the article is completely separated from the normal atmosphere by the packaging material; and d) sealing the packaging materials to prevent such that the normal atmosphere is prevented from accessing the article.

One skilled in the art will appreciate that after the article is packaged a variety of subsequent steps may follow. These steps include, but are not limited to, inspection, labeling, sorting, refrigeration, and shipping.

It is an object of certain embodiments of the present invention to provide a method for producing a package and a packaging machine in a manner which provides a desirable internal atmosphere within such a package. The object is attained by a method for producing a package and a packaging machine according to embodiments of the invention as set forth below and specified in the claims.

In one embodiment, a packaging machine for sealing containers is provided, the packaging machine comprising a conveyor for conveying containers to be sealed, a gas dispensation device provided proximal to the conveyor, the gas dispensation device in fluid communication with at least one gas and adapted to direct the at least one gas to an environment directly surrounding the containers conveyed on the conveyor, the at least one gas comprising not more than approximately 10% oxygen by unit volume, and a container closing device aligned with a transport path of containers defined by the conveyor and provided proximal the gas dispensation device such that an internal volume of containers sealed by the closing device contain the at least one gas. In a preferred embodiment the at least one gas comprises not more than approximately 5% oxygen by unit volume, and in a further preferred embodiment the at least one gas comprises not more than approximately 2% oxygen by unit volume. In a most preferred embodiment the at least one gas comprises not more than approximately 1% oxygen by unit volume.

The gas dispensation device may comprise a substantially planar plate member that is substantially perpendicular to the transport path. In other embodiments, the substantially planar plate member may be substantially parallel to the transport path and disposed above or below the transport path. The substantially planar plate member may comprise a plurality of apertures such that when the gas dispensation device receive at least one gas from a source via an input, the plurality of apertures directs the at least one gas toward the transport path. Further, the gas dispensation device may comprise components that form an enclosed volume that may be any shape, including rectilinear.

In yet another embodiment, a packaging machine for sealing containers is provided, the machine comprising a first conveyor for conveying containers to be sealed, a second conveyor for conveying sealed containers, a substantially vertical planar member comprising a height and provided between the first conveyor and the second conveyor, the planar member adapted for preventing conveyance of a container beyond a predetermined horizontal position, a translator for translating containers to be closed in a substantially vertical direction along the height of the planar member, a closing device provided proximal an upper terminus of the height of the planar portion, wherein the closing device is aligned with a transport path of containers defined by the second conveyor, and the substantially vertical planar member comprising apertures for dispensing at least one gas, the apertures provided such that the at least one gas is dispensed proximal a container and the closing device such that an internal volume of the container comprises the at least one gas when the container is closed.

In certain embodiments, the substantially vertical planar member may comprise a stop plate, which may comprise a forward portion and a rearward portion. Further, in certain embodiments, the substantially vertical planar member may comprise an opposing surface member. In various embodiments, the translator may comprise a platform.

In one embodiment, a method of sealing containers is provided, the method comprising the steps of providing a plurality of unwrapped containers, conveying the containers along a predetermined horizontal transport path, directing the containers toward a substantially vertical plate, the substantially vertical plate comprising a delimiting member for stopping the movement of a tray along the transport path, directing at least one gas from the substantially vertical plate to an area immediately surrounding the container, directing a container at least one of vertically upward and downward, wrapping the container in a substantially air-tight fashion, and conveying the wrapped container along a second predetermined horizontal path. In a further embodiment, the at least one gas may be forced directly onto the contents of the container.

A further advantage of certain embodiments of the invention is the usage of carbon monoxide which helps preserving the bloomed red meat color and which is applied in small concentrations of less than 5% by unit volume, preferably less than 0.5% by unit volume, and most preferably about 0.04% by unit volume (as per GRAS regulations). Advantageously, the carbon dioxide has antimicrobial effects. One embodiment uses an anoxic gas mixture. The advantage of reducing the oxygen in the atmosphere as much as possible is to improve the shelf life. The covering sheet material is a formable film, which can be for example a material that can be used to form trays, but also for example a shrinkable material, in principle any top web forming process to thermo-form such a film or sheet material. If the used sheet material from the top web is shrinkable, shrinking itself is usually done in a separate apparatus after having produced and separated the packages.

In various embodiments, the wrap used to seal or cover trays comprises a laser perforation pattern that allows oxygen to be transmitted from the overwrapped tray to an oxygen absorber. The oxygen absorber may be provided, for example, in a motherbag surrounding the wrapped tray. In certain embodiments, the laser perforations comprise holes of approximately 0.006 inches in diameter. Motherbags are contemplated as being provided with a mixture of nitrogen, carbon dioxide, and carbon monoxide. In a preferred embodiment, the gas composition in the motherbag comprises approximately 69.6% nitrogen, 30% carbon dioxide, and 0.4% carbon monoxide. In various embodiments, methods and systems of the present invention displace oxygen from the tray during wrapping operations. This displacement provides various advantages, including, for example, minimizing the size and cost of the oxygen absorber required in the mother bag.

Furthermore, a packaging machine according to the invention can comprise a forming station to form trays where the product is put in or can be structured in a way that it is provided with formed trays, especially with trays where the product has already been put in.

These and other advantages of the disclosed embodiments of the invention will be apparent from the disclosure, including the figures, contained herein. The above-described embodiments, objectives and configurations are neither complete nor exhaustive. As will be appreciated, other embodiments of the inventions are possible using, alone or in combination, one or more of the features set forth above or described in detail below. Further, the Summary of the Invention is neither intended nor should it be construed as being representative of the full extent or scope of the present invention. Rather, embodiments of the present invention are set forth in various levels of detail in the Summary of the Invention, as well as, in the attached drawings and the Detailed Description of the Invention and no limitation as to the scope of the present invention is intended by either the inclusion or non-inclusion of elements, components, etc. in this Summary of the Invention. Additional aspects of the present invention will become more readily apparent from the Detailed Description, particularly when taken together with the drawings.

BRIEF DESCRIPTION OF DRAWINGS

The accompanying drawings, which are incorporated in and constitute part of the specification, illustrate embodiments of the invention and together with the general description of the invention given above and the detailed description of the drawings given below, serve to explain the principle of these inventions.

It should be understood that the drawings are not necessarily to scale. In certain instances, details that are not necessary for an understanding of the invention or that render other details difficult to perceive may have been omitted from these drawings. It should be understood, of course, that the invention is not limited to the particular embodiments illustrated in the drawings.

DETAILED DESCRIPTION OF THE INVENTION

Figure 1:
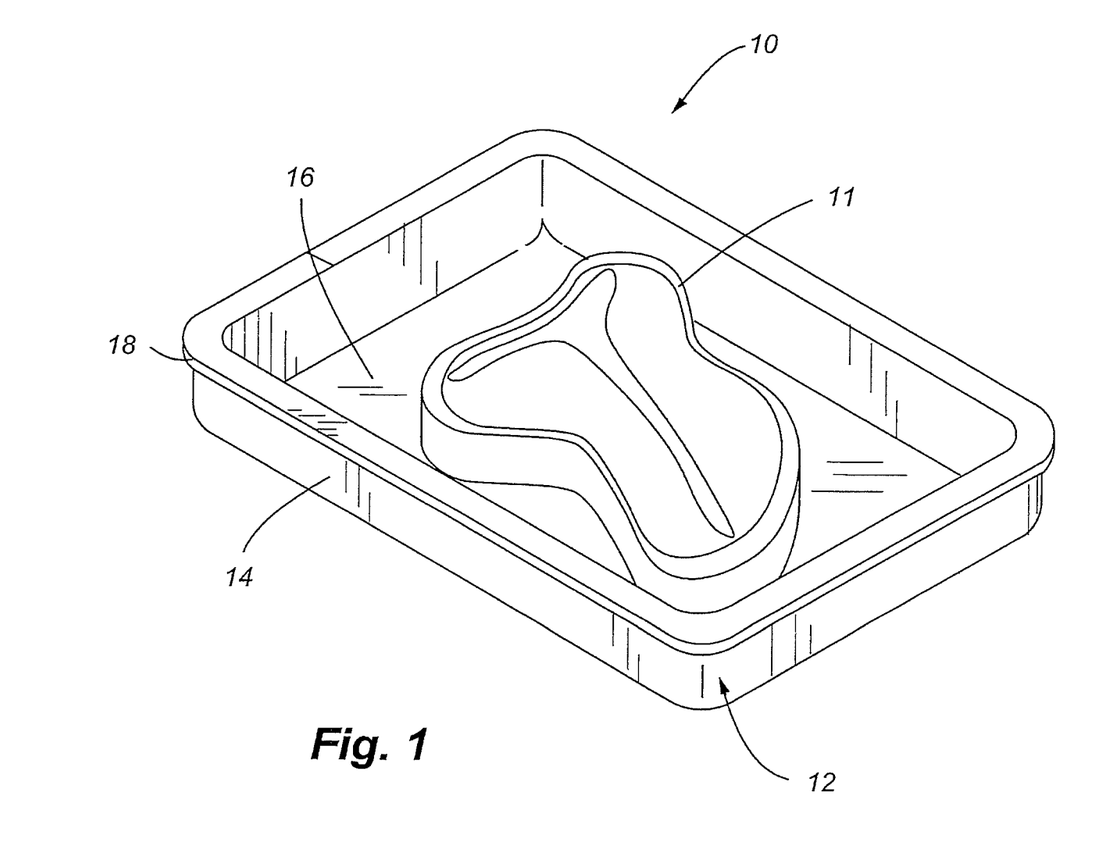
FIG. 1 is an isometric view depicting a meat product in packaging in accordance with embodiments of the present invention.
Figure 2:
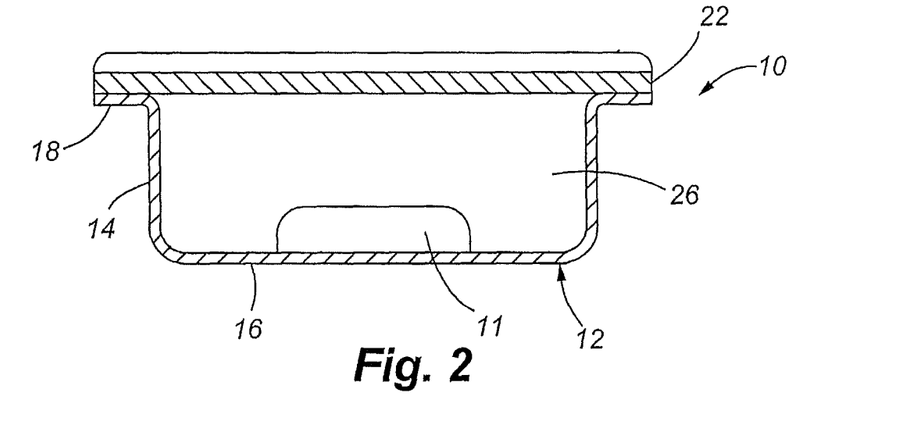
FIG. 2 is an elevation view depicting a meat product in packaging in accordance with embodiments of the present invention.

Referring to FIGS. 1-2, a modified atmosphere package 10 in accordance with at least some embodiments of the present invention is provided. The modified atmosphere package 10 is typically used to encase or surround one or more meat products 11. It will be recognized that although various embodiments of the present invention are particularly well suited for use with meat products, the present invention is not limited to packaging of meat products. Indeed, devices and features of the present invention may be useful with any number of products that require wrapping, particularly those products which require modified atmosphere packaging. The modified atmosphere package 10 includes a tray 12 and an outer package or layer 22. The term "package" or "container" as used herein shall be construed as any device or material capable of holding meat including, but not being limited to, a carton, casing, parcel, holder, tray, flat, bed, film, envelope, and the like. In accordance with various embodiments of the present invention, at least one of the tray 12 and layer 22, are provided as a substantially impermeable layer of material, such that the layer restricts substantially all transmission of gas.

Exemplary polymers which may be used to form the tray 12 include polystyrene foam, cellulose pulp, polyethylene, polypropylene, or any other known plastic or container material. In one embodiment, a polymeric sheet is used to form the tray 12 and is substantially composed of polystyrene foam with a thickness ranging from about 70-90 gauge. Generally, a polystyrene foam tray is used because of its consumer acceptance.

The layer 22 may comprise a film wrapping or cover also comprised of a polymeric material, such as, but not being limited to, a polyolefin or polyvinylchloride, which is substantially permeable to oxygen. The material used to form the cover or the layer preferably contains additives, which allow the material to cling or adhere to the tray 12. The layer 22 may have an oxygen-permeability greater than about 100 cubic centimeters per 100 square inches in 24 hours.

The tray 12 comprises a generally rectangular construction and includes a continuous sidewall 14, a bottom wall 16, and a continuous rim or flange 18. The continuous sidewall 14 encompasses the bottom wall 16. The continuous rim 18 encompasses an upper edge of the continuous sidewall 14 and projects generally laterally outward therefrom. It will be expressly recognized, however, that trays of various different sizes are shapes are also contemplated by the present invention and that no limitation with respect to the size and shape of the tray is provided herewith. A food item 11, such as a retail cut of raw meat, is located in a rectangular compartment defined by the bottom wall 16 and continuous sidewall 14. The meat may have been derived from any type of animal, including, but not being limited to, beef, pork, veal, lamb, venison, fish, crustacean, or any other suitable meat product.

Embodiments of the present invention contemplate providing an internal volume 26 of a tray, as generally defined by the sidewall 14, the bottom wall 16, and the layer 22 and being directly adjacent a meat product 11, with a gas of modified atmosphere. As used herein, the term "modified atmosphere" refers to any local atmosphere within a tray 12 comprising a composition different than that of what is commonly defined as air or ambient air. It is contemplated that an internal volume 26 of the tray be provided with a modified atmosphere so as to preserve tray contents, create desirable pressure differentials, enhance the appearance of a meat or food product, etc. For example, in one embodiment, it is contemplated that trays 12 are provided with an internal volume 26 comprising a modified atmosphere, the modified atmosphere comprising an oxygen concentration of not more than approximately 10% by unit volume. In preferred embodiments, the modified atmosphere comprises an oxygen concentration of not more than approximately 5% by unit volume. In further preferred embodiments, the modified atmosphere comprising an oxygen concentration of not more than approximately 2% by unit volume. In a most preferred embodiment, the modified atmosphere comprising an oxygen concentration of not more than approximately 1% by unit volume Products 11 are typically packaged and sealed in a standard atmosphere environment comprising standard air. Infusing or replacing the internal volume 26 of the tray 12 with a modified atmosphere thus poses complications, particularly when numerous trays are to be packaged and sealed efficiently. The present invention provides solutions to this long-felt problem and need to package meats under certain conditions.

Figure 3:
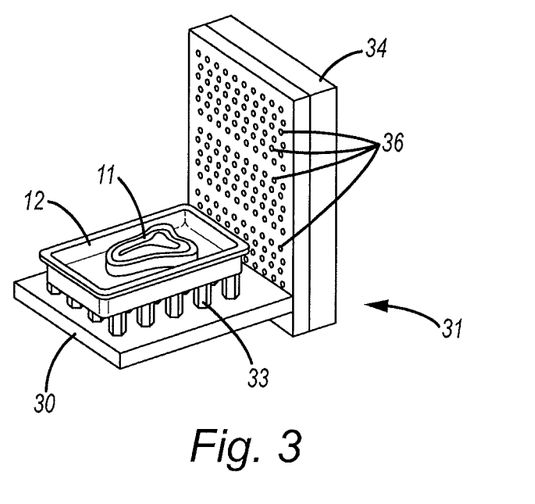
FIG. 3 is a perspective view of a meat wrapping and elevator plate according to one embodiment of the present invention.

As shown in FIG. 3, a stop plate 31 is provided for supplying a tray with a modified atmosphere and facilitating wrapping or sealing of the same. As shown, a tray 12 comprising a meat product 11 is conveyed onto a platform portion 30 which is translatably associated with a stop plate 31. Trays 12 and products 11 are conveyed or transmitted onto the platform 30 via any number of known features and devices including, for example, a conventional conveyor belt (not shown) as will be recognized by one of skill in the art. The platform 30 comprises rollers 33 in various embodiments to aid in the sliding or translation of trays 12 onto the platform 30. The stop plate 31 comprises a substantially vertical structure and generally represents a stop or transition portion in the processing and conveying of meat. The stop plate 31 is provided, for example, on a process line subsequent to placement of the meat 11 in the tray 12 and various analysis steps, but prior to a wrapping step or function. The stop plate 31 comprises apertures or perforations 36 for releasing one or more desired gases to create a modified atmosphere immediately surrounding the tray 12, at least while the tray 12 is provided proximal to the stop plate 31, and displace ambient atmosphere with an inert gas(es).

Figure 4:
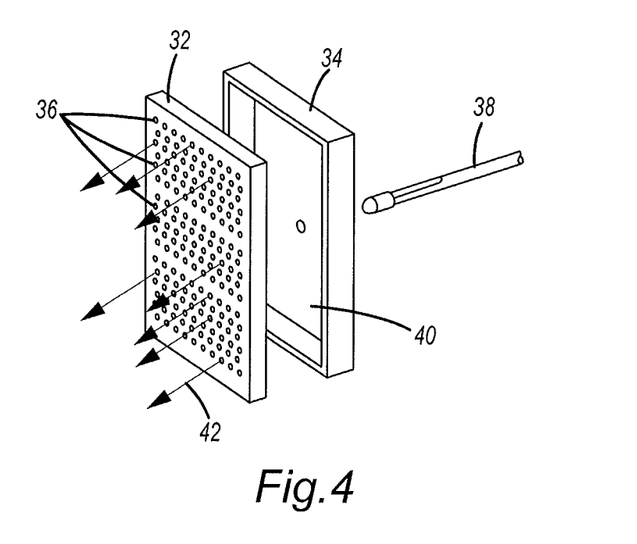
FIG. 4 is an exploded perspective view of a meat wrapping and elevator plate according to one embodiment of the present invention.

FIG. 4 is an exploded perspective view of the stop plate 31 according to one embodiment. As shown, the stop plate 31 comprises a forward portion 32 and a rearward portion 34. The forward portion 32 comprises a plurality of apertures 36 for releasing and directing gas or air proximal a meat product to be packaged. One or more of the apertures 36 may be angled or shaped so as to direct gas generally downward as shown by directional arrows 42 representing an exemplary flow of gas. Although the present invention contemplates using the stop plate 31 to provide and direct a flow of modified atmosphere gas, it will be expressly recognized that the present invention is not so limited. Indeed, any number of gases may be provided through or with the stop plate 31. For example, in one embodiment, it is contemplated that a stop plate 31 is provided with and used for dispensing standard air proximal a meat product so as to clear dust and other particulates from the vicinity of the meat(s), for example. A rearward portion 34 is provided rearward of the forward portion 32 and such that an internal volume 40 is provided therebetween. The internal volume 40 shown in FIG. 4 is rectilinear in shape having multiple faces, but in other embodiments one skilled in the art will appreciate a variety of shapes and configurations. The rearward portion 34 is in fluid communication with at least one conduit 38 for conveying at least one gas to the stop plate 31 and into the internal volume 40. In one embodiment, the conduit 38 comprises a selectively connectable hose for conveying the desired gas. The hose may be disconnected and replaced, in at least some embodiments, when an alternative gas is desired to be supplied to the stop plate 31 and meat 11.

Figure 5:
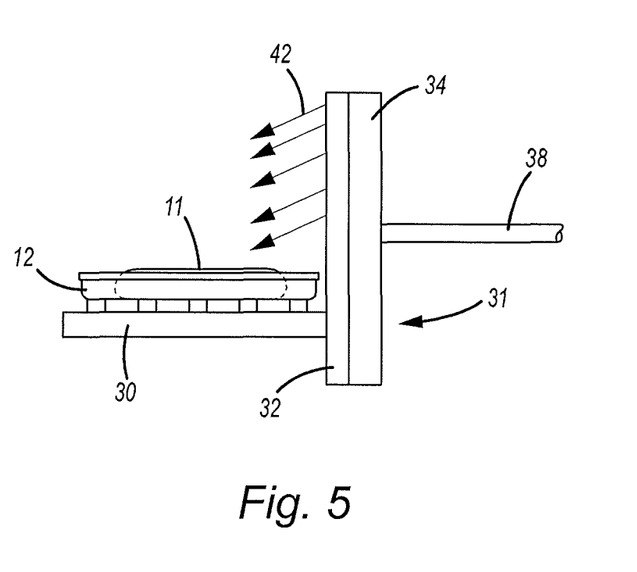
FIG. 5 is a side elevation view of a meat wrapping and elevator plate according to one embodiment of the present invention.

FIG. 5 is a side elevation view of one embodiment of the present invention comprising a stop plate 31 supplied with gas from a conduit 38, the gas being dispensed through a forward portion 32 of the plate 31 to surround a tray 12 and meat product 11. The tray 12 is provided on an elevator portion or platform 30. The platform 30 is translatable along a height of the plate 31, wherein at least a portion of the height of the plate 31 comprises apertures for releasing the gas 42 onto, toward, or proximal the meat product 11. The plate 31, in addition to providing desired gas and thereby modifying a local atmosphere around a meat product, is useful for conveying trays 12 to, for example, alternate conveyors or tracks and/or convey the trays 12 to a wrapping operation as shown and described herein.

Various food packaging devices are known, including those commercially available from ULMA® Packaging. Many of such devices, however, generally comprise horizontal-flow packaging machines adapted for wrapping or placing plastic over-wrap over a tray or product. The present invention contemplates a substantially vertical stop plate 31 in-line with a meat packaging operation, the substantially vertical stop plate 31 adapted to interrupt a horizontal translation of a tray and allow the tray to be directed in a substantially vertical direction while altering an atmosphere immediately surrounding the tray and corresponding meat product.

Figure 6A:
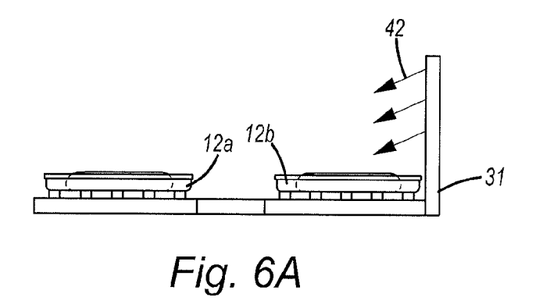
FIGS. 6A-6D depict a system and process for packaging meat in a modified atmosphere according to one embodiment of the present invention.

FIGS. 6A-6D depict a device and sequence according to one embodiment of the present invention wherein a tray 12 is conveyed through a wrapping operation and provided with a modified atmosphere. FIG. 6A depicts a tray 12a conveyed along a belt 40 or similar conveyance device. They tray is transmitting until making contact with substantially vertical stop plate 31, the stop plate 31 comprising various features as shown and described herein.

Figure 6B:
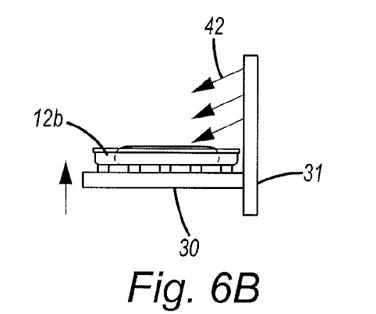

FIG. 6B depicts the tray 12b and the platform 30 as they are translated vertically upward from a first position and subjected to one or more gases 42 provided from the plate 31. Emission of the gases 42 from the stop plate 31 creates a localized environment of desirable modified atmosphere around the meat, such that when the meat is seal or covered, the atmosphere within the packaging is of desirable characteristics.

Figure 6C:
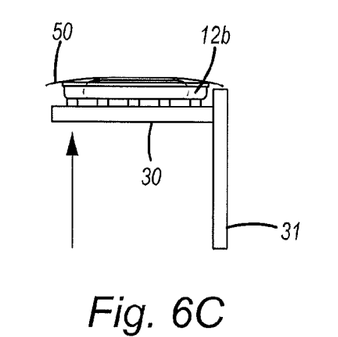
Figure 6D:
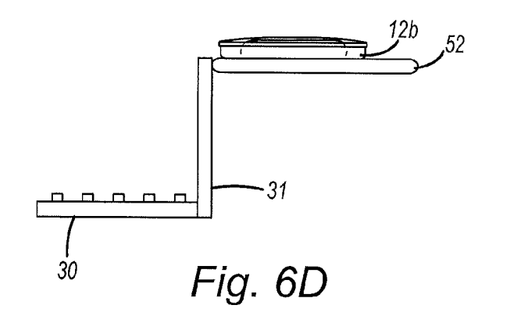

FIG. 6C depicts the platform 30 and tray 12b at an elevated position where the tray is subjected to or wrapped with a film 50. Subsequent to the wrapping operation, a wrapped tray 12b as shown in FIG. 6D is further conveyed to additional steps or processes (inspection, sorting, weighing, labeling, refrigeration, shipping, etc.) via a second conveyor belt or system 52, the second belt 52 disposed at a different vertical location in at least some embodiments. The platform 30 is then conveyed or returned to a lowered position (see, for example, FIG. 6A) where it is situated for receiving additional trays to be elevated and wrapped or sealed.

While various embodiments the present invention have been described in detail, it is apparent that modifications and alterations of those embodiments will occur to those skilled in the art. However, it is to be expressly understood that such modifications and alterations are within the scope and spirit of the present invention, as set forth in the following claims. Further, the invention(s) described herein are capable of other embodiments and of being practiced or of being carried out in various ways. In addition, it is to be understood that the phraseology and terminology used herein is for the purposes of description and should not be regarded as limiting. The use of "including," "comprising," or "adding" and variations thereof herein are meant to encompass the items listed thereafter and equivalents thereof, as well as, additional items.

The foregoing discussion of the invention has been presented for purposes of illustration and description. The foregoing is not intended to limit the invention to the form or forms disclosed herein. In the foregoing description for example, various features of the invention have been identified. It should be appreciated that these features may be combined together into a single embodiment or in various other combinations as appropriate for the intended end use of the band. The dimensions of the component pieces may also vary, yet still be within the scope of the invention. Moreover, though the description of the invention has included description of one or more embodiments and certain variations and modifications, other variations and modifications are within the scope of the invention, e.g. as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation. Rather, inventive aspects lie in less than all features of any single foregoing disclosed embodiment.

What is claimed is:

1. A method of sealing containers, the method comprising the steps of:
    providing a plurality of unwrapped containers;
    conveying the containers along a predetermined horizontal transport path;
    directing the containers toward a substantially vertical plate, the substantially vertical plate comprising a delimiting member for stopping the movement of one of the plurality of unwrapped containers along the transport path;
    directing at least one gas from the substantially vertical plate to an area immediately surrounding the container, said plurality of apertures being angled so as to direct gas generally downward towards the containers;
    directing a container at least one of vertically upward and downward;
    wrapping the container in a substantially air-tight fashion;
    conveying the wrapped container along a second predetermined horizontal path;
    wherein said substantially vertical plate has a forward portion and a rearward portion, said forward portion having a plurality of apertures for releasing and directing gas proximal to the containers, said plurality of apertures provided in the forward portion being arranged both horizontally and vertically and having at least two rows and columns of apertures, said forward portion and said rearward portion having an internal volume provided therebetween and wherein said rearward portion is in fluid communication with at least one conduit for conveying at least one gas to the substantially vertical plate and into the internal volume.

2. The method of claim 1, further comprising conveying the containers to a subsequent operation, the subsequent operation comprising at least one of inspection, labeling, sorting, refrigerating, and shipping.

3. The method of claim 1, wherein wrapping the container is performed at a location proximal the at least one gas directed from the substantially vertical plate such that an internal volume of the wrapped container comprises the at least one gas.

4. The method of claim 1, wherein the at least one gas comprises less oxygen per unit volume than standard air.

5. The method of claim 1, wherein the at least one gas is forced directly onto the contents of the container.

6. A method of sealing containers, the method comprising the steps of:
    providing a plurality of unwrapped containers;
    conveying the containers along a predetermined horizontal transport path;
    directing the containers toward a packaging machine comprising:
        at least one conveyor configured for conveying containers to be sealed;
        a substantially vertical planar member having a plurality of apertures through which at least one gas is dispensed, said plurality of apertures being angled so as to direct gas generally downward towards the containers, said substantially vertical planar member adapted for preventing conveyance of containers beyond a predetermined horizontal position, wherein said substantially vertical plate has a forward portion and a rearward portion, said forward portion having a plurality of apertures for releasing and directing gas proximal to the containers, said plurality of apertures provided in the forward portion being arranged both horizontally and vertically and having at least two rows and columns of apertures, said forward portion and said rearward portion having an internal volume provided therebetween and wherein said rearward portion is in fluid communication with at least one conduit for conveying at least one gas to the substantially vertical plate and into the internal volume a translator for translating containers to be closed in a substantially vertical direction;
    a closing device provided proximal to and aligned with a transport path of the containers;
    directing the containers toward the substantially vertical member, the substantially vertical member comprising a delimiting member for stopping the movement of one of the plurality of unwrapped containers along the transport path;
    receiving the at least one gas from a source, the at least one gas comprising a gas mixture comprising not more than approximately 5% oxygen by unit volume;
    directing at least one gas from the substantially vertical member to an area immediately surrounding the containers;
    using the closing device, applying a plastic over-wrap to said containers in a substantially air-tight fashion; and
    conveying the wrapped container along a second predetermined horizontal path.

7. A method of sealing containers, the method comprising the steps of:
    providing a plurality of unwrapped containers;
    conveying the containers along a predetermined horizontal transport path;
    directing the containers toward a substantially vertical plate, the substantially vertical plate comprising a delimiting member for stopping the movement of one of the plurality of unwrapped containers along the transport path;
    directing at least one gas from the substantially vertical plate to an area immediately surrounding the container, said plurality of apertures being angled so as to direct gas generally downward towards the containers;
    directing a container at least one of vertically upward and downward;
    wrapping the container in a substantially air-tight fashion;
    conveying the wrapped container along a second predetermined horizontal path; and
    wherein said substantially vertical plate stops the movement of the plurality of unwrapped containers prior to the step of wrapping the container, said substantially vertical plate having a forward portion and a rearward portion, said forward portion having a plurality of apertures for releasing and directing gas proximal to the containers when said containers are in a stopped position adjacent the substantially vertical plate, said plurality of apertures provided in the forward portion being arranged both horizontally and vertically and having at least two rows and columns of apertures, said forward portion and said rearward portion having an internal volume provided there between, said internal volume being rectilinear in shape, and wherein said rearward portion is in fluid communication with at least one conduit for conveying at least one gas to the substantially vertical plate and into the internal volume.

8. The method of sealing containers of claim 7, wherein said conduit comprises a selectively connectable hose.

9. The method of sealing containers of claim 7, wherein said plurality of angled apertures creates a localized environment of desired modified atmosphere around the containers, further comprising sealing a film to the containers to create a localized environment of a modified atmosphere in the container when sealed.

10. The method of sealing containers of claim 7, wherein said apertures extend the height of the vertical plate.

11. The method of sealing containers of claim 7, wherein said substantially vertical plate interrupts a horizontal translation of a container and allows the container to be directed in a substantially vertical direction, while altering an atmosphere immediately surrounding the containers.

12. The method of sealing containers of claim 7, wherein containers physically are in contact with said substantially vertical plate when the step of directing at least one gas is performed.

\* \* \* \* \*